United States Patent
Wang et al.

(10) Patent No.: US 11,936,758 B1
(45) Date of Patent: Mar. 19, 2024

(54) EFFICIENT PARALLELIZATION AND DEPLOYMENT METHOD OF MULTI-OBJECTIVE SERVICE FUNCTION CHAIN BASED ON CPU + DPU PLATFORM

(71) Applicant: NANJING UNIVERSITY OF AERONAUTICS AND ASTRONAUTICS, Nanjing (CN)

(72) Inventors: Ran Wang, Nanjing (CN); Qiang Wu, Nanjing (CN); Jie Hao, Nanjing (CN); Xue Yu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/485,205

(22) Filed: Oct. 11, 2023

(30) Foreign Application Priority Data

Nov. 1, 2022 (CN) .......................... 202211352904.1

(51) Int. Cl.
*H04L 67/61* (2022.01)
*G06F 9/48* (2006.01)
(Continued)

(52) U.S. Cl.
CPC ............ *H04L 67/61* (2022.05); *G06F 9/4881* (2013.01); *G06F 9/5066* (2013.01); *H04L 41/145* (2013.01); *H04L 41/16* (2013.01)

(58) Field of Classification Search
CPC ....... G06F 9/45558; G06F 2009/45595; G06F 9/455; H04L 45/38; H04L 45/745; H04L 47/22
See application file for complete search history.

(56) References Cited

U.S. PATENT DOCUMENTS

| | | | |
|---|---|---|---|
| 2019/0104071 A1* | 4/2019 | Kobayashi | H04L 45/42 |
| 2019/0199649 A1* | 6/2019 | Kobayashi | H04L 47/70 |
| 2020/0026575 A1* | 1/2020 | Guim Bernat | G06F 9/45558 |

FOREIGN PATENT DOCUMENTS

| | | |
|---|---|---|
| CN | 110022230 A | 7/2019 |
| CN | 113411207 A | 9/2021 |
| CN | 113918277 A | 1/2022 |

OTHER PUBLICATIONS

Meigen Huang, Tao Wang, Liang Liu, Ruiqin Pang, and Huan Du; Virtual Network Function Deployment Strategy Based on Software Defined Network Resource Optimization Computer Science, Issue S1, 404-408 Publication date: Jun. 15, 2020.
(Continued)

*Primary Examiner* — Hitesh Patel
(74) *Attorney, Agent, or Firm* — CBM PATENT CONSULTING, LLC

(57) ABSTRACT

An efficient parallelization and deployment method of a multi-objective service function chain based on a CPU+DPU platform solves the problem of multi-objective deployment by constructing a heterogeneous computing architecture composed of an orchestrator and a server based on a CPU+DPU structure; the orchestrator is responsible for receiving an SFC request from a network operator; an SFC deployment algorithm based on deep reinforcement learning is operated, including a parallel strategy, a VNF topological order strategy and a DPU processing strategy to obtain an optimal deployment scheme of each request; then a resource management module is invoked to manage resources; and finally, a driver module is invoked to transmit the deployment scheme to a server for placement, and the server completes the deployment of SFC by using the CPU or the DPU respectively according to the deployment scheme.

6 Claims, 9 Drawing Sheets

(51) Int. Cl.
 G06F 9/50 (2006.01)
 H04L 41/14 (2022.01)
 H04L 41/16 (2022.01)

(56) References Cited

OTHER PUBLICATIONS

Weilin Zhou; Yuan Yang; Weiming Xu; Review of Research on Network Function Virtualization Technology Computer Research and Development, Issue 04, p. 675-688 Publication date: Apr. 15, 2018.

* cited by examiner

| Type | VNF | Dependent relationship | VNF features |
|---|---|---|---|
| Monitor | Traffic Logger (TL) | >prec-shapers | Record packets and their statistics |
| Monitor | Traffic Visualizer (TV) | >prec-shapers | Visualize the statistics of traffic flows |
| Monitor | Packet Header Inspector (PHI) | >prec-shapers,<succ-shapers | Check packet headers and decide to forward or drop any packet |
| Monitor | Deep Packet Inspector (DPI) | >prec-shapers,<succ-shapers | Check packet contents and decide to forward or drop any packet |
| Monitor | DDoS Scrubber (DS) | >prec-shapers,<succ-shapers | Identify and remove malicious traffic flows |
| Shaper | Network Address Translator (NAT) | >prec-shapers,PHI,DPI,DS,<succ-shapers | Modify IP header to map one IP address space into another |
| Shaper | Traffic Zipper (TZ) | >prec-shapers,PHI,DPI,DS,<succ-shapers,TU | Compress packets to shrink the traffic volume |
| Shaper | Traffic Unzipper (TU) | >prec-shapers,PHI,DPI,DS,<succ-shapers | Uncompress the compressed packets into the original format |
| Shaper | Traffic Encryptor (TE) | >prec-shapers,PHI,DPI,DS,<succ-shapers,TD | Convert packets into cipher text |
| Shaper | Traffic Decryptor (TD) | >prec-shapers,PHI,DPI,DS,<succ-shapers | Recover the cipher text into plain text |

EFFICIENT PARALLELIZATION AND DEPLOYMENT METHOD OF MULTI-OBJECTIVE SERVICE FUNCTION CHAIN BASED ON CPU + DPU PLATFORM

CROSS-REFERENCE TO RELATED APPLICATIONS

This application claims priority to Chinese Patent Application Ser. No. CN202211352904.1 filed on 1 Nov. 2022.

TECHNICAL FIELD

The present invention belongs to a service function chain orchestration technology, and particularly relates to an efficient parallelization and deployment method of a multi-objective service function chain based on a CPU+DPU platform.

BACKGROUND

The traditional mode of completing data forwarding based on a central process unit (CPU) has a bottleneck, and a computing architecture only composed of CPU cannot meet diversified scenarios and business requirements. On one hand, as Moore's law is slowed down, the network bandwidth and the connection number are increased more widely and more densely than a data path, computing nodes at ends, edges and cloud are directly exposed under the increased data volume, and the computing power increasing speed of the CPU and the network bandwidth increasing speed show a "scissor difference"; and on the other hand, in a high concurrent forwarding work, it is difficult for the serial computing mode of the CPU to exert the maximum computing power.

The advent of network function virtualization (NFV) provides a novel way to design, coordinate, deploy, and standardize various mobile services to support increasingly complex and diverse service requests, thereby making SFC deployment more flexible and agile. A current service function chain (SFC) deployment system focuses on optimizing the network resource utilization ratio, and does not consider the diversity of service requirements and the degradation of service forwarding performance.

A cloud architecture based on a data processing unit (DPU) uninstalls and accelerates the network and storage system as required, compared with a graphics processing unit (GPU), a field programmable gate array (FPGA) and an application-specific integrated circuit (ASIC), the higher-cost host CPU computing power is liberated, and the ultimate performance can be achieved more economically and effectively. The architecture transformation caused by DPU improves the energy efficiency cost ratio of the whole data center resource pool and the profit cost ratio of public cloud manufacturers to a certain extent, and the DPU can cover more and more demands and scenarios in the future. In this regard, the research content of the present invention is to solve some problems faced by the current traditional computing architecture and the traditional SFC deployment system based on DPU.

SUMMARY

An objective of the present invention is: to solve the problems of reduced forwarding performance, diversified scenarios and requirements and the like of the current traditional computing architecture and the traditional SFC deployment system, the present invention provides an efficient parallelization and deployment method of a multi-objective service function chain based on a CPU+DPU platform.

The technical solution is: an efficient parallelization and deployment method of a multi-objective service function chain based on a CPU+DPU platform includes the following steps:

(1) constructing a heterogeneous computing architecture for solving the multi-objective deployment problem, where the heterogeneous computing architecture comprises an orchestrator responsible for management and coordination, and a server based on a CPU+DPU structure;

(2) converting serial SFCs into parallel SFCs by an SFC parallel strategy according to the independence among virtual network functions (VNF), and accordingly solving the SFC parallel problem;

where an objective function of the SFC parallel problem is to minimize additional resource consumption and delay caused by copying and merging of the data packet:

$$\min(\alpha C + \beta \Delta d)$$

where $\alpha$ and $\beta$ respectively represent weight coefficients of the additional resource consumption and delay, $$C = \sum_{\mu=1}^{|R|} \sum_{\forall B \in r_\mu} 64 \times \frac{\Phi_B - 1}{U}$$

represents an additional resource consumption caused by copying and merging of the data packet, and $$\Delta d = \sum_{\mu=1}^{|R|} 30 \times \frac{v_\mu}{10^9}$$

represents an additional delay caused by copying and merging of the data packet;

an objective of the SFC parallel strategy is to identify a VNF in the chain according to a dependency relationship among the VNFs to find all chains executable in parallel;

(3) for the situation that a plurality of SFCs arrive at the same time at a certain moment, adopting a VNF topological order algorithm, deploying the VNFs according to a topological order obtained by the algorithm, and reducing the delay by combining the sharing and scaling characteristics of the VNFs, where the VNF topological order algorithm is used for constructing a VNF topological order for the plurality of SFCs and deploying the VNFs according to the order to reduce the delay;

(4) adopting a DPU processing strategy for a service request with a high real-time requirement, where the DPU processing strategy is used for processing computing tasks including network protocol processing, data encryption and decryption and data compression to save a CPU computing resource and reduce the delay;

in a case that there is a high-priority request in the request set that arrives at a certain moment, determining whether there is a VNF responsible for the data processing task in the request, using DPU for rapid processing in a case that there is a VNF responsible for the data processing task in the request, and using CPU for processing in a case that there is no VNF responsible for the data processing task in the request; and (5) proposing an SFC heterogeneous deployment algorithm based on deep reinforcement learning, where the heterogeneous algorithm is capable of deploying the SFC respectively according to the number and situation of the requests arriving at different moments, according to the number and situation of the requests arriving at different moments, the SFC heterogeneous deployment algorithm based on deep reinforcement learning is processed with different strategies respectively, that is, a parallel strategy, a VNF topological order strategy and a DPU processing strategy to achieve deployment of SFC.

Further, the heterogeneous computing architecture in step (1) is specifically described as follows:

the architecture is composed of an orchestrator and a server, where the orchestrator includes an SFC deployment algorithm module, a resource management module and a driver module; and the server includes a CPU, a DPU and a bus for connecting the CPU and the DPU. The orchestrator is responsible for managing and deploying the arrived SFC, and the server composed of a heterogeneous computing structure is responsible for sequentially processing VNFs in different SFCs according to the deployment strategy conveyed by the orchestrator. The specific task of the orchestrator includes: receiving an SFC request from a network operator and operating the SFC deployment algorithm to determine which SFCs are accepted and how to place these SFCs. To consider different situations of different requests, the method respectively calls the parallel strategy, the VNF topological order strategy and the DPU processing strategy so as to obtain an optimal deployment scheme of each request, then a resource management module is invoked to manage resources, and finally, a driver module is invoked to transmit the deployment scheme to a server for placement, and the server completes the deployment of SFC by using the CPU or the DPU respectively according to the deployment scheme.

Further, the multi-objective SFC deployment problem in step (1) is specifically described as follows:

an objective function of the SFC deployment problem is as follows:

$$\min(f_1 + f_2 + f_3)$$

$$\text{s.t. } C_1, C_2, C_3$$

$$\begin{cases} f_1 = \sum_{r_\mu \in R} D_\mu \\ f_2 = \sum_{r_\mu \in R} y_{r_\mu} B_\mu \tau_r \\ f_3 = C(\tau) \end{cases}$$

For $f_1$, $D_\mu$ is a total response delay, that is, $$D_\mu = L_\mu + P_\mu + T_\mu + \overline{W_q}$$

where $L_\mu = \sum_{e_h^\mu \in E_\mu} \sum_{e_j \in E} x_{e_h^\mu}^{e_j} D_{e_j}$ is a communication delay, $P_\mu = \sum_{f_v^\mu \in F_\mu} \sum_{n_i \in N} x_{f_v^\mu}^{n_i} \cdot$ $$\frac{1}{\frac{\eta_{m_i}^\mu c_{m_i}}{w_{m_i}^\mu} - \lambda_\mu + \varepsilon}$$

is a processing delay, $$T_\mu = \sum_{f_v^\mu \in F_\mu} \frac{U}{v_\mu}$$

is a transmission delay, and $\overline{W_q}$ is an average queuing delay.

For $f_2$, $\sum_{r_\mu \in R} y_{r_\mu} B_\mu \tau_r$ is a total throughput, the binary variable $y_{r_\mu}$ represents whether $r_\mu$ is accepted, $B_\mu$ is a minimum bandwidth of the SFC, and $\tau_r = l*\Delta$ represents the survival time of the SFC.

For $f_3$, $C(\tau)$ represents a total deployment cost, that is, $$C(\tau) = SC(\tau) + C_{scale}(\tau) C_{DPU}(\tau)$$

$SC(\tau)$ represents a total operation cost, that is, the sum of the cost of turning on the server and the cost of successfully placing the VNF:

$$SC(\tau) = \sum_{n_i \in N} \sum_{f_v^\mu \in F_\mu} x_{f_v^\mu}^{n_i} \zeta_c C_{f_v^\mu} + \sum_{e_j \in E} \sum_{e_h^\mu \in E_\mu} x_{e_h^\mu}^{e_j} \zeta_B B_\mu + \sum_{n_i \in N} \zeta_O$$

$x_{f_v^\mu}^{n_i}$ represents whether VNF $f_v^\mu \in F_\mu$ is deployed on a server node $n_i \in N$ in the request $r_\mu \in R$, $x_{e_h^\mu}^{e_j}$ represents whether a virtual link $e_h^\mu \in E_\mu$ is mapped to a physical link $e_j \in E$ in the request $r_\mu \in R$, $\zeta_c$ and $\zeta_B$ respectively represent the unit costs of the resource and the bandwidth, $C_{f_v^\mu}$ represents the resource requirement of VNF $f_v^\mu \in F_\mu$, and $\zeta_O$ represents the cost of turning on the server.

$C_{scale}(\tau) = \sum_{n_i \in N} \sum_{f_v^\mu \in F_\mu} C^h \cdot x_{n_i, h}^{f_v^\mu}$ represents a total scaling cost, $C^h$ represents a horizontal scaling cost, and $x_{n_i, h}^{f_v^\mu}$ represents whether VNF $f_v^\mu \in F_\mu$ is horizontally scaled.

$C_{DPU}(\tau)$ represents the total use cost of DPU and is defined as follows:

$$C_{DPU}(\tau) = \sum_{n_i \in N} \sum_{f_v^\mu \in F_\mu} \zeta_{c_D} x_{n_i, D}^{f_v^\mu} C_{f_v^\mu} + \zeta_{B_D} x_{n_i, D}^{f_v^\mu} B_\mu$$

where $\zeta_{c_D}$ and $\zeta_{B_D}$ represent the unit costs of the resource and bandwidth during use of DPU, and $x_{n_i, D}^{f_v^\mu}$ represents whether VNF $f_v^\mu \in F_\mu$ is processed with DPU. The resource constraint is as follows:

$$C_1: \forall n_i \in N, \sum_{f_v^\mu \in F_\mu} \sum_{l \in N} s_{n_i, \tau}^{f_v^\mu} \cdot C_{f_v^\mu} \leq C_{n_i}$$

where $s_{n_i, \tau}^{f_v^\mu}$ represents the number of service examples of VNF $f_v^\mu \in F_\mu$ on a node n. E and $C_{n_i}$ represents the size of resources (CPU and memory) of the node $n_i \in N$.

The bandwidth constraint is as follows:

$$C_2: \forall e_j \in E, \sum_{r_\mu \in R} \sum_{e_h^\mu \in E_\mu} x_{e_h^\mu}^{e_j} \cdot a_{r, \tau} \cdot B_\mu \leq B_{e_j}$$

where $a_{r, \tau}$ represents whether the request $r_\mu \in R$ is still in the service, and $B_{e_j}$ represents the bandwidth size of the node $n_i \in N$.

The delay constraint is as follows:

$$C_3: \forall_\mu, \mu \in R, D_\mu \leq D_\mu^{max}$$

where $D_\mu^{max}$ represents the size of a maximum end-to-end delay.

Further, the SFC parallel problem in step (2) is specifically described as follows:

in SFC, some VNFs may work independently without affecting other VNFs, so the serial SFCs can be converted into the parallel SFCs. However, not all VNFs in the SFC can work in parallel. In a case that two VNFs modify the content of the flow or violate a dependency constraint, the operations of the two VNFs are in conflict. Only in a case that the VNFs in the SFC are independent of each other, parallel processing can be performed among the VNFs; otherwise, the correctness of the network and service strategy may be destroyed.

According to the method of the present invention, the VNFs are divided into two types of monitors and shapers, where the monitors are responsible for monitoring the flow rate without any modification, and the shapers are used for processing and modifying the flow rate. Since the VNFs in the SFCs are applied to each data packet flow necessarily according to a specific order, the VNFs form a dependency relationship It is stipulated in the present invention that in a case that one VNF $f_v^\mu$ is before another VNF $f_{v+1}^\mu$, $f_{v+1}^\mu$ depends on $f_v^\mu$, denoted as $f_v^\mu \prec f_{v+1}^\mu$.

To process the data packet in parallel, two functions are required, that is, a copying function and a merging function.

When one data packet enters, the copying function will copy the data packet and send the data packet to the VNFs capable of being processed in parallel. After the data packet is processed, the copied data packet is merged by the merging function. The copying and merging of the data packet will cause additional resource consumption and delay. Therefore, in the SFC parallel problem, an objective function of the SFC parallel problem is to minimize additional resource consumption and delay caused by copying and merging of the data packet:

$$\min(\alpha C + \beta \Delta d)$$

where $\alpha$ and $\beta$ respectively represent weight coefficients of the additional resource consumption and delay.

C represents the additional resource consumption caused by the copying and merging of the data packet, with the following formula:

$$C = \sum_{\mu=1}^{|R|} \sum_{\forall B \in r_\mu} 64 \times \frac{\Phi_B - 1}{U}$$

where B is one group of parallel branches, $\Phi_B$ represents the parallelism degree of B, and U represents the size of the data packet.

The additional delay $\Delta d$ caused by the copying and merging of the data packet may be represented as:

$$\forall B \in r_\mu \in R, \Delta d = \sum_{\mu=1}^{|R|} 30 \times \frac{v_\mu}{10^9}$$

where $V_\mu$ is the data quantity of the μth SFC in the request R.

For the SFC parallel problem, the flow constraint is introduced. $O_c$ is used for representing a set of copying nodes in $r_\mu$, and $O_m$ represents a set of merging nodes in $r_\mu$. $O_c(n_i)$ and $O_m(n_i)$ respectively represent the number of the copying nodes and the merging nodes in $r_\mu$. For $r_\mu$, except the copying nodes, the merging nodes, the source node and the target node, all intermediate nodes meet the flow conservation, that is, $$\forall r_\mu \in R, \forall n_h \in N, n_h \notin \{n_{src}, n_{dst}, O_c, O_m\}:$$
$$\sum_{e_h^\mu \in E_\mu} \sum_{n_g \in N} x_{e_h^\mu}^{n_g, n_h} - \sum_{e_h^\mu \in E_\mu} \sum_{n_k \in N} x_{e_h^\mu}^{n_h, n_k} = 0$$

In a case that the source node is one copying node, it is necessary to meet the constraint condition:

$$\forall r_\mu \in R, \forall n_{src} \in Oc: \sum_{e_h^\mu \in E_\mu} \sum_{n_v \in N} x_{e_h^\mu}^{n_{src}, n_u} -$$
$$\sum_{e_h^\mu \in E_\mu} \sum_{n_v \in N} x_{e_h^\mu}^{n_v, n_{src}} = O_c(n_{src})$$

In a case that the target node is one merging node, it is necessary to meet the following constraint condition:

$$\forall r_\mu \in R, \forall n_{dst} \in Om: \sum_{e_h^\mu \in E_\mu} \sum_{n_v \in N} x_{e_h^\mu}^{n_v, n_{dst}} -$$
$$\sum_{e_h^\mu \in E_\mu} \sum_{n_v \in N} x_{e_h^\mu}^{n_{dst}, n_u} = O_m(n_{dst})$$

For the situation that other nodes are the copying nodes, it should meet the following formula:

$$\forall r_\mu \in R, \forall n_h \in Oc, \sum_{f_v^\mu \in F_\mu} x_{f_v^\mu}^{n_h} = 1: \sum_{e_h^\mu \in E_\mu} \sum_{n_v \in N} x_{e_h^\mu}^{n_h,}$$
$$n^u - \sum_{e_h^\mu \in E_\mu} \sum_{n_v \in N} x_{e_h^\mu}^{n_v, n_h} = O_c(n_h) - O_m(n_h)$$

For the situation that other nodes are the merging nodes, it should meet the following formula:

$$\forall r_\mu \in R, \forall n_h \in Om, \sum_{f_v^\mu \in F_\mu} x_{f_v^\mu}^{n_h} = 1: \sum_{e_h^\mu \in E_\mu} \sum_{n_v \in N} x_{e_h^\mu}^{n_v,}$$
$$n^h - \sum_{e_h^\mu \in E_\mu} \sum_{n_v \in N} x_{e_h^\mu}^{n_h, n_u} = O_m(n_h) - O_c(n_h)$$

Further, an objective of the SFC parallel strategy in step (2) is to identify a VNF in the chain according to a dependency relationship among the VNFs to find all chains executable in parallel. The specific algorithm process of the SFC parallel strategy is as follows:

21) initializing a branch chain set B, a main chain S and a monitor set M;

22) traversing $r_\mu$: in a case that $f_i^\mu \in r_\mu$ is monitor, firstly initializing a branch chain b E B, then adding $f_i^\mu$ into b and M; and in a case that $f_i^\mu \in r_\mu$ is shaper, adding $f_i^\mu$ into a main chain S, at this time, searching monitor on which $f_i^\mu$ depends on in M, for each such monitor, for example, $k \in M$, having a branch chain that takes k as an end point at present, then pointing k to $f_i^\mu$ so as to extend the branch chain to take $f_i^\mu$ as an end point, and removing k from M;

23) invoking a path search algorithm to find all path sets PATH executable in parallel; and 24) returning to the branch chain set B, the main chain S and the path set PATH.

Further, the objective of the VNF topological order algorithm in step (3) is to find a VNF topological order about a plurality of SFCs, and the delay can be reduced by deploying the VNF according to the order. The specific algorithm process is as follows:

31) initializing f as a source node;

32) traversing a request set R arriving at the same time, invoking an algorithm 1 to obtain the branch chain set B, the main chain S and the path set PATH, evaluating a path with a maximum delay in all the paths according to the path set PATH, and adding the path into a set C;

33) traversing C, and creating a directed weighted graph graph=(F, ω), where F is a set of VNFs;

34) invoking a minimum feedback arc set algorithm to solve a minimum feedback arc set of graph, verifying whether the solved topological order meets the dependency relationship of the VNFs among different chains, returning to the topological order in a case that the solved topological order meets the dependency relationship of the VNFs among different chains, otherwise, returning to False(that is, the dependency condition is violated, and the algorithm cannot be used).

Further, the DPU processing strategy in step (4) is specifically described as follows:

an objective of the DPU processing strategy is to take over the data processing tasks which CPU is not good at, such as network protocol processing, data encryption and decryption and data compression, thereby saving the CPU computing resource and reducing the delay.

In a case that there is a high-priority request in the request set that arrives at a certain moment, it is determined whether there is a VNF responsible for the data processing tasks, such as network protocol processing, data encryption and decryption and data compression, in the request. DPU is used for rapid processing in a case that there is a VNF responsible for the data processing task in the request, and CPU is for processing in a case that there is no VNF responsible for the data processing task in the request.

Further, according to the number and situation of the requests arriving at different moments, the objective of the SFC heterogeneous deployment algorithm based on deep reinforcement learning in step (5) is processed with different strategies respectively, that is, a parallel strategy, a VNF topological order strategy and a DPU processing strategy to achieve deployment of SFC better. The specific algorithm process is as follows:

51) deleting an overtime request by a system first, dividing the arrived requests R by a priority judgment apparatus according to the real-time performance, dividing the request with high real-time performance into a high-priority R_high, and dividing the requests with low real-time performance into a low-priority R_low;

52) initializing a time slot T;

53) according to the numbers of R_high and R_low, determining which strategy to adopt to process the SFC;

54) constructing and training a neural network model, taking the status of the current physical network, the characteristic of the request being processed and the above information as an input, and outputting the deployment strategy of each VNF through the computation of the neural network; and 55) updating the network status.

The beneficial effects are as follows: compared with the prior art, the method of the present invention adopts DPU to solve the current traditional computing architecture and the traditional SFC deployment system, liberates the data processing tasks which CPU is not good at, such as the network protocol processing, data encryption and decryption and data compression by combining CPU and DPU, saves the computing resource and optimizes the processing efficiency. Based on the implementation of the method, the present invention provides VNF topological order algorithm, a DPU processing strategy and an SFC parallel strategy; a novel way is provided to design, coordinate, deploy, and standardize various mobile services to support increasingly complex and diverse service requests, thereby making SFC deployment more flexible and agile; and the diversity of the service requirement is considered, and the service forwarding performance is improved.

BRIEF DESCRIPTION OF THE DRAWINGS

FIG. 3 is a dependency relationship diagram of VNF according to the present invention;

DETAILED DESCRIPTION OF THE EMBODIMENTS

Figure 1:
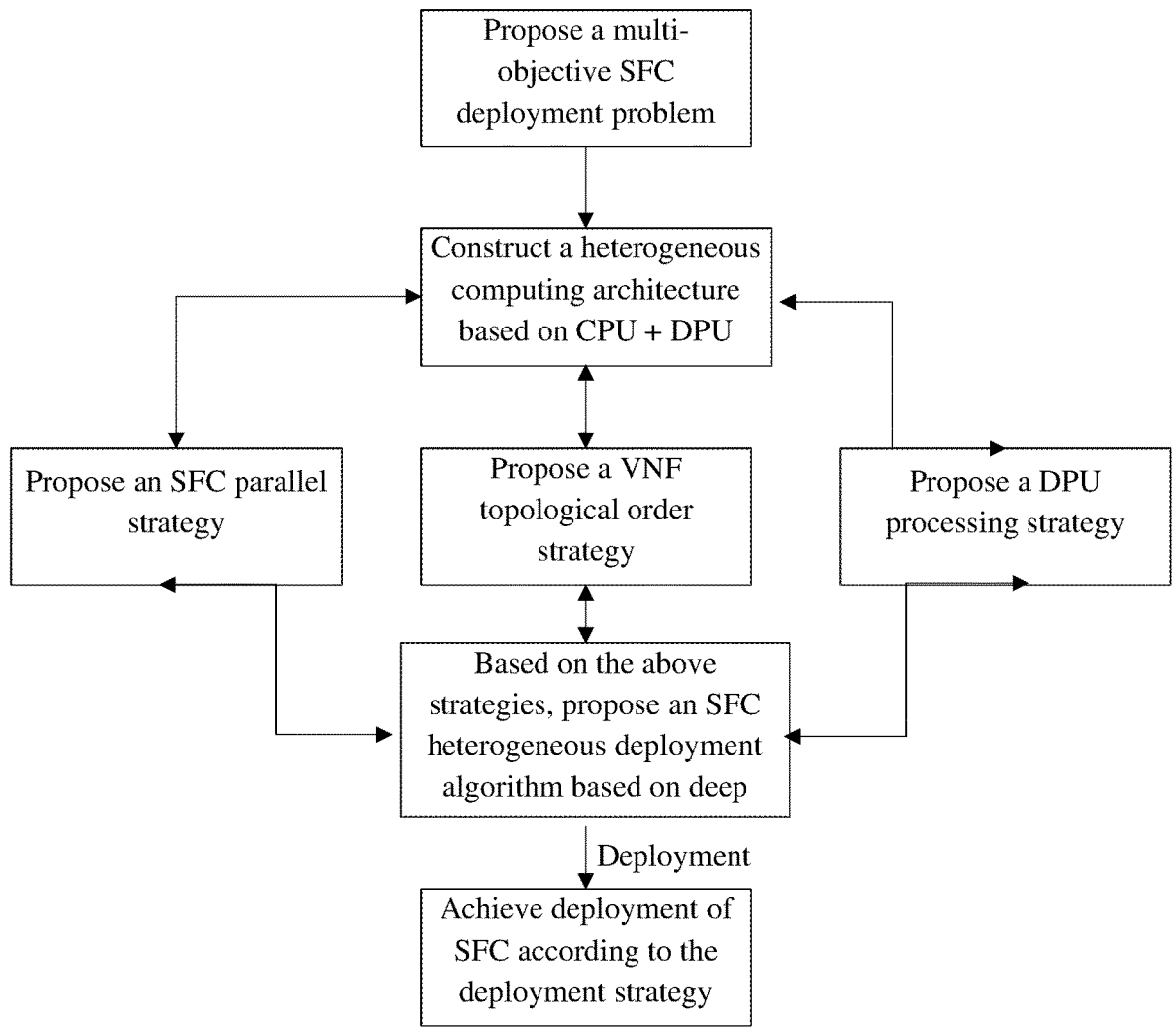
FIG. 1 is a schematic flowchart of a method according to the present invention.

To describe the technical solution disclosed by the present invention in detail, the present invention is further described below with reference to the accompanying drawings and embodiments.

The present invention provides an efficient parallelization and deployment method of a multi-objective service function chain based on a CPU+DPU platform, which is mainly used for solving the problems of reduced forwarding performance, diversified scenarios and requirements and the like faced by the current traditional computing architecture and the traditional SFC deployment system.

Infrastructures such as cloud computing, a data center and an intelligent computing center rapidly expand the capacity, the network bandwidth is developed from 10G to 25G, 40G, 100G, 200G, even 400G. The traditional mode of completing data forwarding based on CPU has a bottleneck. To improve the data forwarding performance of CPU, Intel launches a data plane development kit (DPDK) accelerating scheme, and the I/O data processing performance is improved by bypassing a kernel protocol stack and in a user status kernel binding polling mode, thereby greatly increasing the packet forwarding rate. However, under the trend of large bandwidth, the CPU overhead of this scheme is hard to ignore. At the 25G bandwidth rate, most data centers only require 25% or even more of CPU overhead to meet the data I/O requirement of the business. In addition, with the popularization of an artificial intelligence scenario, more and more AI computer tasks on cloud propose more extreme requirements for the delay performance of the network and storage I/O; and the high-performance network, such as remote direct data access (RDMA) and nonvolatile memory host controller interface specification (NVMe), and the storage protocol are hard to meet the multi-tenant requirement scenarios of cloud computing under the traditional network card architecture. Under this background, DPU comes into being to solve many problems of the I/O performance bottleneck in the post-moore era and the development limitation of the virtualization technology.

DPU is a novel data processing unit integrating network acceleration in the 5G era. In essence, DPU is classified computing, which uninstalls data processing/preprocessing from CPU, and at the same time distributes computing power closer to a place where data occurs, thus reducing communication traffic. RDMA, network function, storage function, security function and virtualization function are fused in the DPU. The DPU may be used for taking over the data processing tasks which the CPU is not good at, such as network protocol processing, data encryption and decryption and data compression, and taking the transmission and computing requirements into account. In addition, the DPU may also play a role of a connection hub. One end is connected to local resources such as CPU, GPU, a solid hard disk (SSD) and FPGA acceleration card, and one end is connected to network resources such as a switch/router. In general, the DPU improves the network transmission efficiency and releases the CPU computing power resource, thereby driving the whole data center to reduce cost and enhance efficiency. Compared with the traditional network card, the DPU increases the cost of a single part, but the introduction of the DPU liberates the host CPU computing power with higher cost and releases more saleable resources. Therefore the architecture transformation caused by the DPU increases the energy efficiency cost ratio of the whole data center resource pool and the revenue cost ratio of public cloud vendors to a certain extent. The DPU may cover more and more requirements and scenarios in the future. Meanwhile, the introduction of the NFV causes the SFC deployment to face the problems of low forwarding efficiency, diversified service requirements and the like. Under this opportunity background, the present invention studies the heterogeneous computing architecture composed of CPU and DPU, and the architecture is used for solving the SFC deployment problem.

The implementation process of the technical solution provided by the present invention is described below in detail.

The method of the present invention deploys the SFC by taking CPU+DPU as a computing architecture. An orchestrator and a server are mainly included. The orchestrator is responsible for receiving an SFC request from a network operator and running an SFC deployment algorithm to determine which SFCs are accepted and how to place these accepted SFCs. The server composed of a heterogeneous computing structure is responsible for deploying the SFC respectively by CPU or DPU according to the deployment strategy conveyed by the orchestrator.

The main implementation process of the method of the present invention is shown in FIG. 1. Based on the above technical solution, further detailed description is performed in this embodiment, specifically including the following steps:

(1) construct a heterogeneous computing architecture for solving the multi-objective deployment problem, where the architecture includes an orchestrator responsible for management and coordination, and a server based on a CPU+DPU structure;

(2) propose an SFC parallel problem according to the independence among VNFs, and propose an SFC parallel strategy and convert the serial SFCs into parallel SFCs;

(3) for the situation that a plurality of SFCs arrive at the same time at a certain moment, propose a VNF topological order algorithm, deploy the VNFs according to a topological order obtained by the algorithm, and significantly reduce the delay by combining the sharing and scaling characteristics of the VNFs;

(4) for a service request with a high real-time requirement, propose a DPU processing strategy, that is, using DPU for rapid processing according to the arrival situation and number of the requests; and (5) propose an SFC heterogeneous deployment algorithm based on deep reinforcement learning, where the heterogeneous algorithm can deploy the SFC according to the number and situation of the requests arriving at different moments.

The implementation process is described below in detail.

1. Construct a Heterogeneous Computing Architecture

Figure 2:
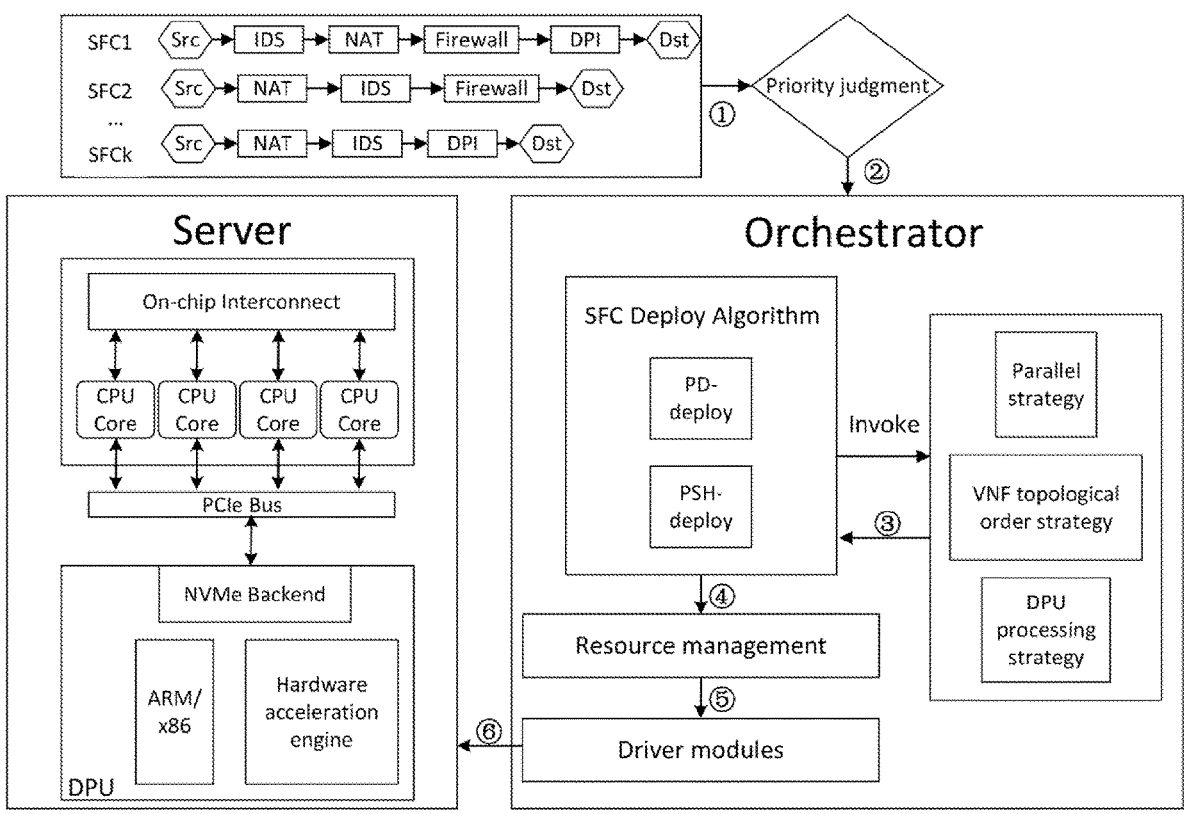
FIG. 2 is a system architecture diagram of a method according to the present invention.

As shown in FIG. 2, the heterogeneous computing architecture is composed of an orchestrator and a server, where the orchestrator includes an SFC deployment algorithm module, a resource management module and a driver module; and the server includes a CPU, a DPU and a bus for connecting the CPU and the DPU. The orchestrator is responsible for managing and deploying the arrived SFC, and the server composed of a heterogeneous computing structure is responsible for sequentially processing VNFs in different SFCs according to the deployment strategy conveyed by the orchestrator. The specific task of the orchestrator includes: receiving an SFC request from a network operator and running the SFC deployment algorithm to determine which SFCs are accepted and how to place these SFCs. To consider different situations of different requests, the method respectively calls the parallel strategy, the VNF topological order strategy and the DPU processing strategy so as to obtain an optimal deployment scheme of each request, then a resource management module is invoked to manage resources, and finally, a driver module is invoked to transmit the deployment scheme to a server for placement, and the server completes the deployment of SFC by using the CPU or the DPU respectively according to the deployment scheme.

2. Propose a Multi-Objective SFC Deployment Problem by Combining with the Reality and the Proposed Computing Architecture.

An objective function of the SFC deployment problem is as follows:

$$\min(f_1 + f_2 + f_3)$$
$$\text{s.t. } C_1, C_2, C_3$$
$$\begin{cases} f_1 = \sum_{r_\mu \in R} D_\mu \\ f_2 = \sum_{r_\mu \in R} y_{r_\mu} B_\mu \tau_r \\ f_3 = C(\tau) \end{cases}$$

for $f_1$, $D_\mu$ is a total response delay, that is, $$D_\mu = L_\mu + P_\mu + T_\mu + \overline{W_q}$$

where $L_\mu = \sum_{e_h{}^u \in E_\mu} \sum_{e_j \in E} x_{e_h{}^u}{}^{e_j} D_{e_j}$ is a communication delay, $P_\mu = \sum_{f_v{}^u \in F_\mu} \sum_{n_i \in N} x_{f_v{}^u}{}^{n_i}$.

$$\frac{1}{\frac{n_{m_i}^\mu c_{m_i}}{w_{m_i}^\mu} - \lambda_\mu + \varepsilon}$$

is a processing delay, $$T_\mu = \sum_{f_v^\mu \in F_\mu} \frac{U}{v_\mu}$$

is a transmission delay, and $\overline{W_q}$ is an average queuing delay.

For $f_2$, $\sum_{r_\mu \in R} y_{r_\mu} B_\mu \tau_r$ is a total throughput, the binary variable $y_{r_\mu}$ represents whether $r_\mu$ is accepted, $B_\mu$ is a minimum bandwidth of the SFC, and $\tau_r = 1*\Delta$ represents the survival time of the SFC.

For $f_3$, $C(\tau)$ represents a total deployment cost, that is, $$C(\tau) = SC(\tau) + C_{scale}(\tau) C_{DPU}(\tau)$$

$SC(\tau)$ represents a total operation cost, that is, the sum of the cost of turning on the server and the cost of successfully placing the VNF:

$$SC(\tau) = \sum_{n_i \in N} \sum_{f_v{}^u \in F_\mu} x_{f_v{}^u}{}^{n_i} \zeta_c C_{f_v{}^u} + \sum_{e_j \in E} \sum_{e_h{}^u \in E_\mu} x_{e_h{}^u}{}^{e_j} \zeta_B B_\mu + \sum_{n_i \in N} \zeta_O$$

$x_{f_v^\mu}^{n_i}$ represents whether VNF $f_v^\mu \in F_\mu$ is deployed on a server node $n_i \in N$ in the request $r_\mu \in R$, $x_{e_h^\mu}^{e_j}$ represents whether a virtual link $e_h^\mu \in E_\mu$ is mapped to a physical link $e_j \in E$ in the request $r_\mu \in R$, $\zeta_c$ and $\zeta_B$ respectively represent the unit costs of the resource and the bandwidth, $C_{f_v^\mu}$ represents the resource requirement of VNF $f_v^\mu \in F_\mu$, and $\zeta_O$ represents the cost of turning on the server.

$C_{scale}(\tau) = \Sigma_{n_i \in N} \Sigma_{f_v^\mu \in F_\mu} C^h \cdot x_{n_i,h}^{f_v^\mu}$ represents a total scaling cost, $C^h$ represents a horizontal scaling cost, and $x_{n_i,h}^{f_v^\mu}$ represents whether VNF $f_v^\mu \in F_\mu$ is horizontally scaled.

$C_{DPU}(\tau)$ represents the total use cost of DPU and is defined as follows:

$$C_{DPU}(\tau) = \Sigma_{n_i \in N} \Sigma_{f_v^\mu \in F_\mu} \zeta_{c_D} x_{n_i,D}^{f^\mu} C_{f_v^\mu} + \zeta_{B_D} x_{n_i,D}^{f_v^\mu} B_\mu$$

where $\zeta_{c_D}$ and $\zeta_{B_D}$ represent the unit costs of the resource and bandwidth during use of DPU, and $x_{n_i,D}^{f^\mu}$ represents whether VNF $f_v^\mu \in F_\mu$ is processed with DPU.

The resource constraint is as follows:

$$C_1: \forall n_i \in N, \sum_{f_v^\mu \in F_\mu} \sum_{l \in N_{f_v^\mu}} s_{n_i,\tau}^{f_v^\mu} \cdot C_{f_v^\mu} \leq C_{n_i}$$

where $s_{n_i,\tau}^{f_v^\mu}$ represents the number of service examples of VNF $f_v^\mu \in F_\mu$ on a node $n_i \in N$, and $C_{n_i}$ represents the size of resources (CPU and memory) of the node $n_i \in N$.

The bandwidth constraint is as follows:

$$C_2: \forall e_j \in E, \Sigma_{r_\mu \in R} \Sigma_{e_h^\mu \in E_\mu} x_{e_h^\mu}^{e_j} \cdot a_{r,\tau} \cdot B_\mu \leq B_{e_j}$$

where $a_{r,\tau}$ represents whether the request $r_\mu \in R$ is still in the service, and $B_{e_j}$ represents the bandwidth size of the node $n_i \in N$.

The delay constraint is as follows:

$$C_3: \forall r_\mu \in R, D_\mu \leq D_\mu^{max}$$

where $D_\mu^{max}$ represents the size of a maximum end-to-end delay.

3. Propose an SFC Parallel Problem by Combining with Reality

In SFC, some VNFs may work independently without affecting other VNFs, so the serial SFCs can be converted into the parallel SFCs. However, not all VNFs in the SFC can work in parallel. In a case that two VNFs modify the content of the flow or violate a dependency constraint, the operations of the two VNFs are in conflict. Only in a case that the VNFs in the SFC are independent of each other, parallel processing can be performed among the VNFs; otherwise, the correctness of the network and service strategy may be destroyed.

According to the present invention, the VNFs are divided into two types of monitors and shapers, where the monitors are responsible for monitoring the flow rate without any modification, and the shapers are used for processing and modifying the flow rate. Since the VNFs in the SFCs are applied to each data packet flow necessarily according to a specific order, the VNFs form a dependency relationship It is stipulated in the present invention that in a case that one VNF $V_f^\mu$ is before another VNF $f_{v+1}^\mu$, $f_{v+1}^\mu$ depends on $f_v^\mu$, denoted as $f_v^\mu < f_{v+1}^\mu$. A dependency relationship among different VNFs is shown in FIG. 3.

Figure 4:
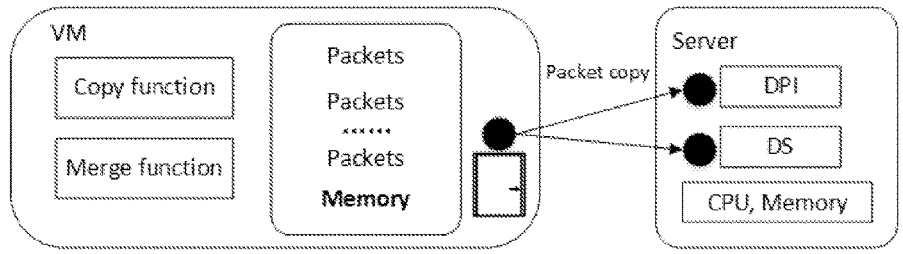
FIG. 4 is a diagram of copy and merging function according to the present invention.

To process the data packet in parallel, two functions are required: 1) a copying function, and 2) a merging function. As shown in FIG. 4, when one data packet enters, the copying function will copy the data packet and send the data packet to the VNFs capable of being processed in parallel. After the data packet is processed, the copied data packet is merged by the merging function. The copying and merging of the data packet will cause additional resource consumption and delay. Therefore, in the SFC parallel problem, an objective function of the SFC parallel problem is to minimize additional resource consumption and delay caused by copying and merging of the data packet:

$$\min(\alpha C + \beta \Delta d)$$

where $\alpha$ and $\beta$ respectively represent weight coefficients of the additional resource consumption and delay.

C represents the additional resource consumption caused by the copying and merging of the data packet, with the following formula:

$$C = \sum_{\mu=1}^{|R|} \sum_{\forall B \in r_\mu} 64 \times \frac{\Phi_B - 1}{U}$$

where B is one group of parallel branches, $\Phi_B$ represents the parallelism degree of B, and U represents the size of the data packet.

The additional delay $\Delta d$ caused by the copying and merging of the data packet may be represented as:

$$\forall B \in r_\mu \in R, \Delta d = \sum_{\mu=1}^{|R|} 30 \times \frac{V_\mu}{10^9}$$

where $V_\mu$ is the data quantity of the μth SFC in the request R.

For the SFC parallel problem, the flow constraint is introduced. $O_c$ is used for representing a set of copying nodes in $r_\mu$, and $O_m$ represents a set of merging nodes in $r_\mu$. $O_c(n_i)$ and $O_m(n_i)$ respectively represent the number of the copying nodes and the merging nodes in For except the copying nodes, the merging nodes, the source node and the target node, all intermediate nodes meet the flow conservation, that is, $$\forall r_\mu \in R, \forall n_h \in N, n_h \notin \{n_{src}, n_{dst}, O_c, O_m\}:$$
$$\Sigma_{e_h^\mu \in E_\mu} \Sigma_{n_g \in N} x_{e_h^\mu}^{n_g, n_h} - \Sigma_{e_h^\mu \in E_\mu} \Sigma_{n_k \in N} x_{e_h^\mu}^{n_h, n_k} = 0$$

In a case that the source node is one copying node, it is necessary to meet the constraint condition:

$$\forall r_\mu \in R, \forall n_{src} \in Oc: \Sigma_{e_h^\mu \in E_\mu} \Sigma_{n_v \in N} x_{e_h^\mu}^{n_{src}, n_u} - \Sigma_{e_h^\mu \in E_\mu} \Sigma_{n_v \in N} x_{e_h^\mu}^{n_v, n_{src}} = O_c(n_{src})$$

In a case that the target node is one merging node, it is necessary to meet the following constraint condition:

$$\forall r_\mu \in R, \forall n_{dst} \in Om: \Sigma_{e_h^\mu \in E_\mu} \Sigma_{n_v \in N} x_{e_h^\mu}^{n_v, n_{dst}} - \Sigma_{e_h^\mu \in E_\mu} \Sigma_{n_u \in N} x_{e_h^\mu}^{n_{dst}, n_u} = O_m(n_{dst})$$

For the situation that other nodes are the copying nodes, it should meet the following formula:

$$\forall r_\mu \in R, \forall n_h \in Oc, \Sigma_{f_v^\mu \in F_\mu} x_{f_v^\mu}^{n_h} = 1: \Sigma_{e_h^\mu \in E_\mu} \Sigma_{n_u \in N} x_{e_h^\mu}^{n_h, n_u} - \Sigma_{e_h^\mu \in E_\mu} \Sigma_{n_v \in N} x_{e_h^\mu}^{n_v, n_h} = O_c(n_h) - O_m(n_h)$$

For the situation that other nodes are the merging nodes, it should meet the following formula:

$$\forall r_\mu \in R, \forall n_h \in Om, \Sigma_{f_v^\mu \in F_\mu} x_{f_v^\mu}^{n_h} = 1: \Sigma_{e_h^\mu \in E_\mu} \Sigma_{n_v \in N} x_{e_h^\mu}^{n_v, n_h} - \Sigma_{e_h^\mu \in E_\mu} \Sigma_{n_u \in N} x_{e_h^\mu}^{n_h, n_u} = O_m(n_h) - O_c(n_h)$$

4. Design an SFC Parallel Strategy

An objective of the SFC parallel strategy is to identify a VNF in the chain according to a dependency relationship among the VNFs to find all chains executable in parallel. The specific algorithm process of the SFC parallel strategy is as follows:

1) initialize a branch chain set B, a main chain S and a monitor set M;

2) traverse $r_\mu$: in a case that $f_i^\mu \in r_\mu$ is monitor, firstly initialize a branch chain $b \in B$, then adding $f_i^\mu$ into b and M; and in a case that $f_i^\mu \in r_\mu$ is shaper, add $f_i^\mu$ into a main chain S, at this time, search monitor on which $f_i^\mu$ depends on in M, for each such monitor, for example, $k \in M$, having a branch chain that takes k as an end point at present, then point k to $f_i^\mu$ so as to extend the branch chain to take $f_i^\mu$ as an end point, and remove k from M;

3) invoke a path search algorithm to find all path sets PATH executable in parallel; and 4) return to the branch chain set B, the main chain S and the path set PATH.

5. Design a VNF Topological Order Strategy

An objective of the VNF topological order algorithm is to find a VNF topological order about a plurality of SFCs, and the delay can be reduced by deploying the VNF according to the order. The specific algorithm process is as follows:

1) initialize f as a source node;

2) traverse a request set R arriving at the same time, invoke an algorithm 1 to obtain the branch chain set B, the main chain S and the path set PATH, solve a path with a maximum delay in all the paths according to the path set PATH, and add the path into a set C;

3) traverse C, and create a directed weighted graph graph=(F, $\omega$), where F is a set of VNFs;

4) invoke a minimum feedback arc set algorithm to solve a minimum feedback arc set of graph, verify whether the solved topological order meets the dependency relationship of the VNFs among different chains, return to the topological order in a case that the solved topological order meets the dependency relationship of the VNFs among different chains, otherwise, return to False(that is, the dependency condition is violated, and the algorithm cannot be used).

6. Design a DPU Processing Strategy

An objective of the DPU processing strategy is to take over the data processing tasks which CPU is not good at, such as network protocol processing, data encryption and decryption and data compression, thereby saving the CPU computing resource and reducing the delay.

In a case that there is a high-priority request in request set that arrives at a certain moment, it is determined whether there is a VNF responsible for the data processing tasks, such as network protocol processing, data encryption and decryption and data compression, in the request. DPU is used for rapid processing in a case that there is a VNF responsible for the data processing task in the request, and CPU is for processing in a case that there is no VNF responsible for the data processing task in the request.

Figure 5:
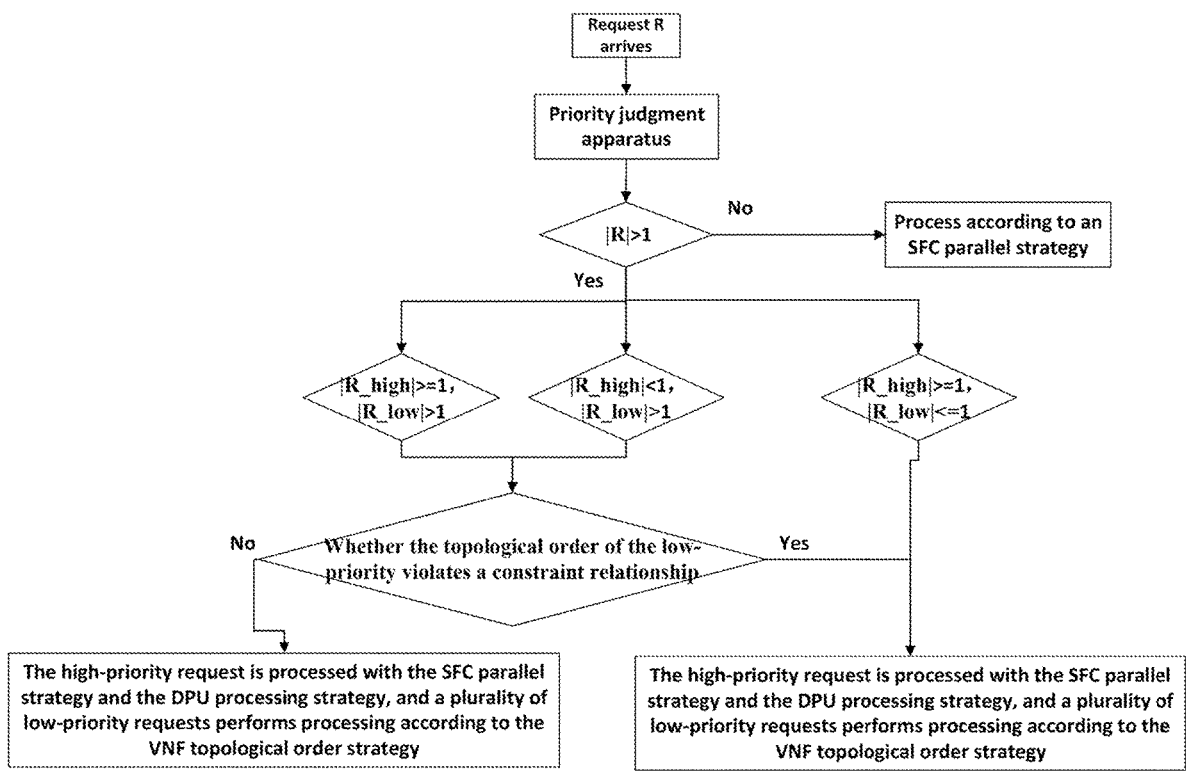
FIG. 5 is a flowchart of an SFC deployment algorithm according to the present invention.

7. Design an SFC Heterogeneous Deployment Algorithm Based on Deep Reinforcement Learning According to the Above Strategy and Architecture An objective of the SFC heterogeneous deployment algorithm based on deep reinforcement learning is to respectively adopt different strategies for processing according to the number and situation of requests arriving at different moments, that is, a parallel strategy, a VNF topological order strategy and a DPU processing strategy, thereby better deploying the SFC. The specific algorithm process is as follows:

1) delete an overtime request by a system first, divide the arrived requests R by a priority judgment apparatus according to the real-time performance, divide the request with high real-time performance into a high-priority R_high, and divide the requests with low real-time performance into a low-priority R_low;

2) initialize a time slot T;

3) according to the numbers of R_high and R_low, determine which strategy to adopt to process the SFC, as shown in FIG. 5 for details;

4) construct and train a neural network model, take the status of the current physical network, the characteristic of the request being processed and the above information as an input, and output the deployment strategy of each VNF through the computation of the neural network; and 5) update the network status.

8. Achieve Deployment of SFC According to a Deployment Strategy

The orchestrator in the heterogeneous computing architecture calls the driver module to transfer the deployment scheme to the server for placement, and the server respectively uses CPU or DPU to complete the best deployment of the SFC according to the deployment scheme, thereby reducing the delay and cost.

In this embodiment, to verify the actual effect of the present invention (PSHD), a stimulated comparison experiment is performed with other two algorithms (BASE and FCPM) by taking the request number as a control variable. Since BASE and PSHD have the same objective, one group of experiments taking the request arrival rate as the control variable is performed in this embodiment, thereby proving the effectiveness of the present invention.

Figure 6:
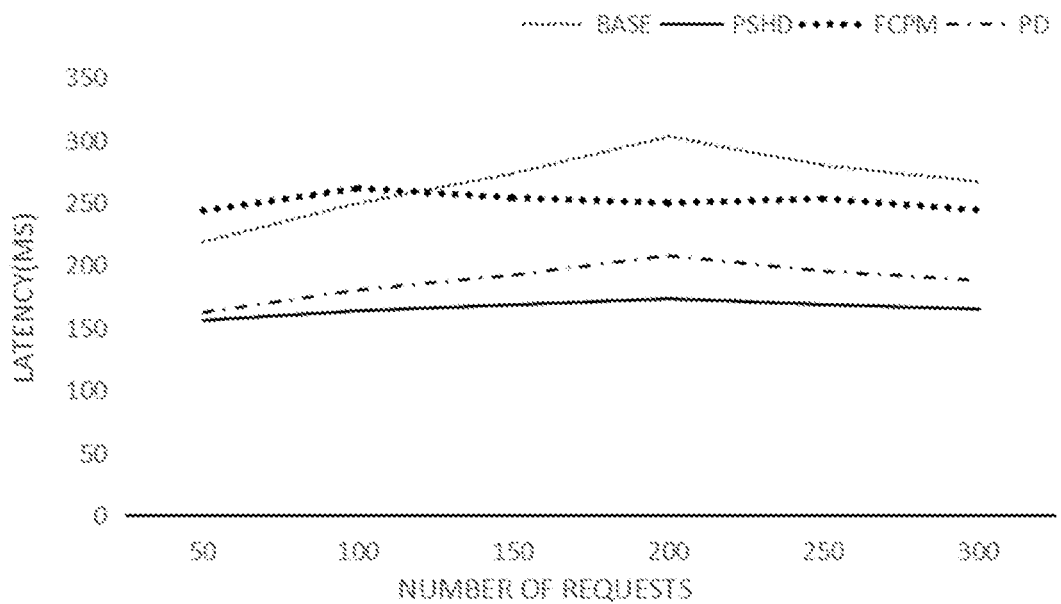
FIG. 6 is a comparison diagram of an average delay of each batch under different requests.
Figure 7:
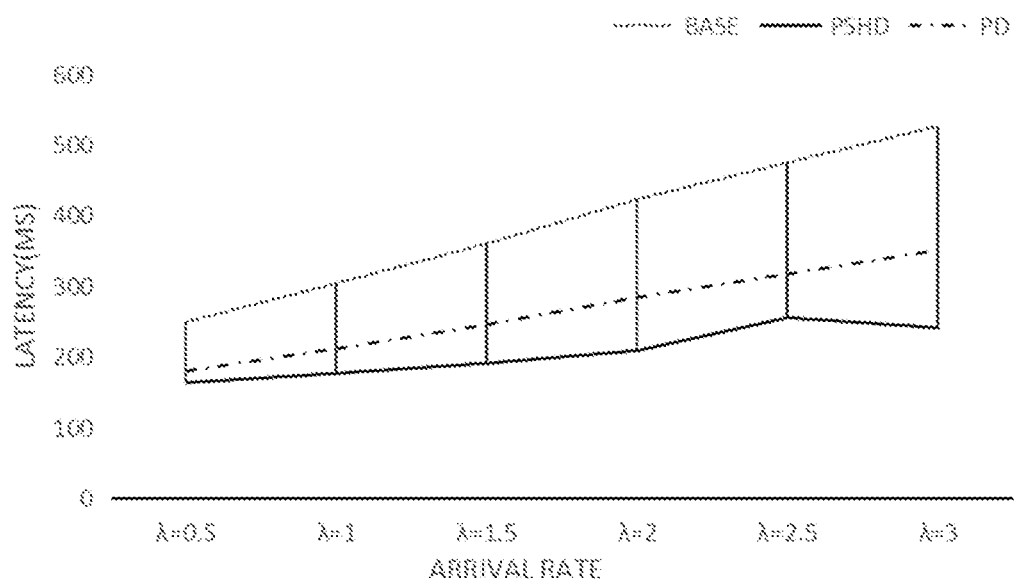
FIG. 7 is a comparison diagram of an average delay of each batch under different arrival rates.

FIG. 6 compares the average delay of each batch of three algorithms in a case that the number of the service nodes is 12 and the number of the requests changes from 50 to 300. As can be seen from the figure, the delay of the method of the present invention is always minimum, and with the increase of the number of the requests, the delay gap between the method of the present invention and other algorithms is increasing, indicating that the more the number of the requests, the better the delay reduction performance of the method of the present invention, which is 37.73% and 34.26% lower than the delays of BASE and FCPM, respectively. FIG. 7 also shows that the delay of the method of the present invention is always the lowest in a case that the number of the requests is 100 and the arrival rate of the requests changes from 0.5 to 3. With the increase of the arrival rate of the requests, it can be seen that the delay gap between the method of the present invention and BASE is larger and larger, indicating that the more the number of the requests arriving at the same moment, the better the delay reduction performance of the method of the present invention, which is 47.04% lower than the delay of BASE. In addition, PD in FIG. 6 and FIG. 7 shows the delay trend in a case that a VNF topological order strategy is not adopted. It can be seen that the delay gap between PD and the method of the present invention is gradually increasing, which proves the effectiveness of reducing the delay by the VNF topological order strategy.

Figure 8:
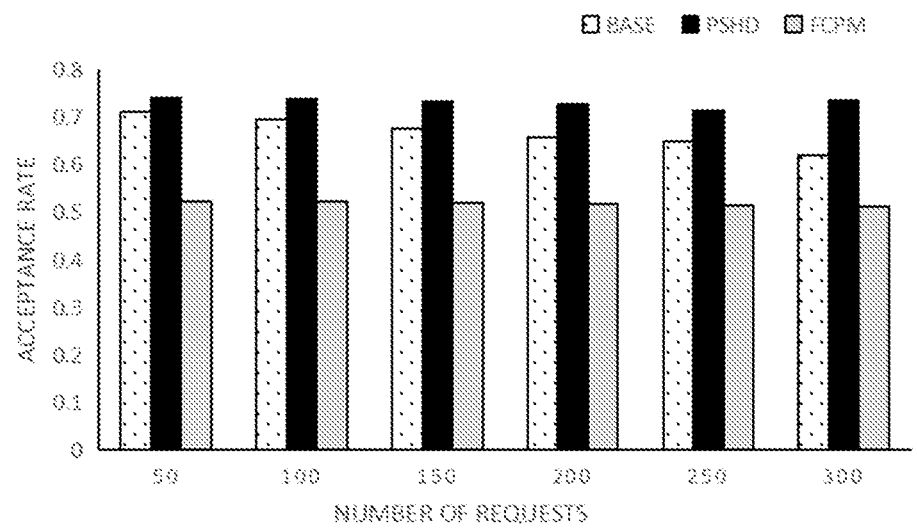
FIG. 8 is a comparison diagram of a request acceptance rate under different requests.
Figure 9:
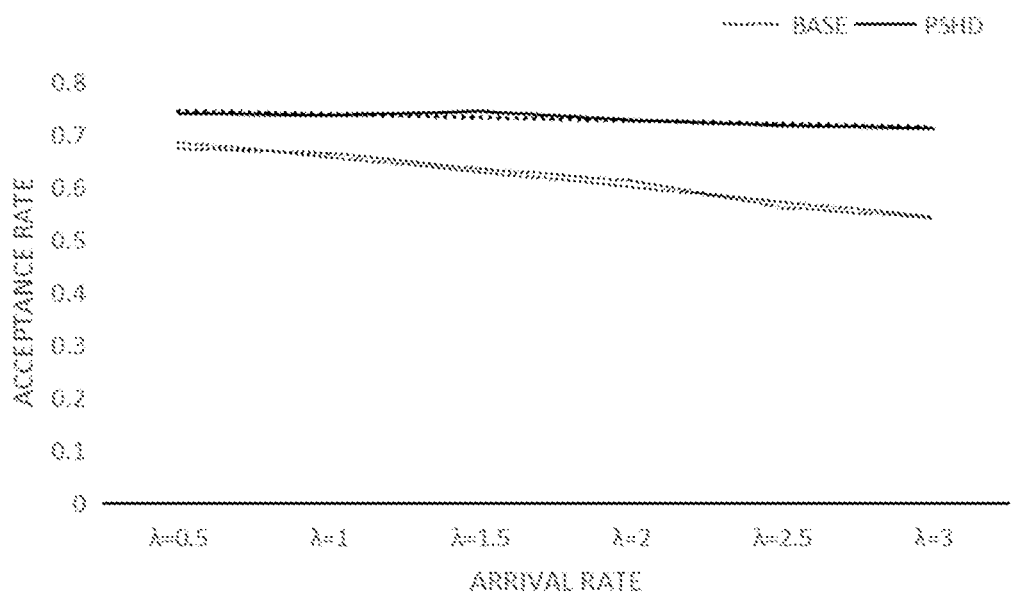
FIG. 9 is a comparison diagram of a request acceptance rate under different arrival rates.

In this embodiment, compared with the most advanced method, the request acceptance rate of the method of the present invention is discussed. FIG. 8 describes the result in a case that the number of the service nodes is 12 and the number of the requests changes from 50 to 300. FIG. 9 describes the result in a case that the number of the service nodes is 100 and the arrival rate of the requests changes from 0.5 to 3. As shown in FIG. 8, the request acceptance rate of the method of the present invention is the highest, with an average of 0.728, followed by the BASE algorithm with an average of 0.668, and the acceptance rate of FCPM is the lowest and is 0.517. FIG. 9 also proves the request acceptance rate of the method of the present invention is the highest, with an average of 0.719. It can be seen from the figure that with the increase of the arrival rate, the reduction trend of the request acceptance rate of BASE is obviously greater than that of the method of the present invention, which provides that the more the requests arriving at a certain moment, the worse the deployment ability of BASE, and the stronger the deployment ability of the method of the present invention.

Figure 10:
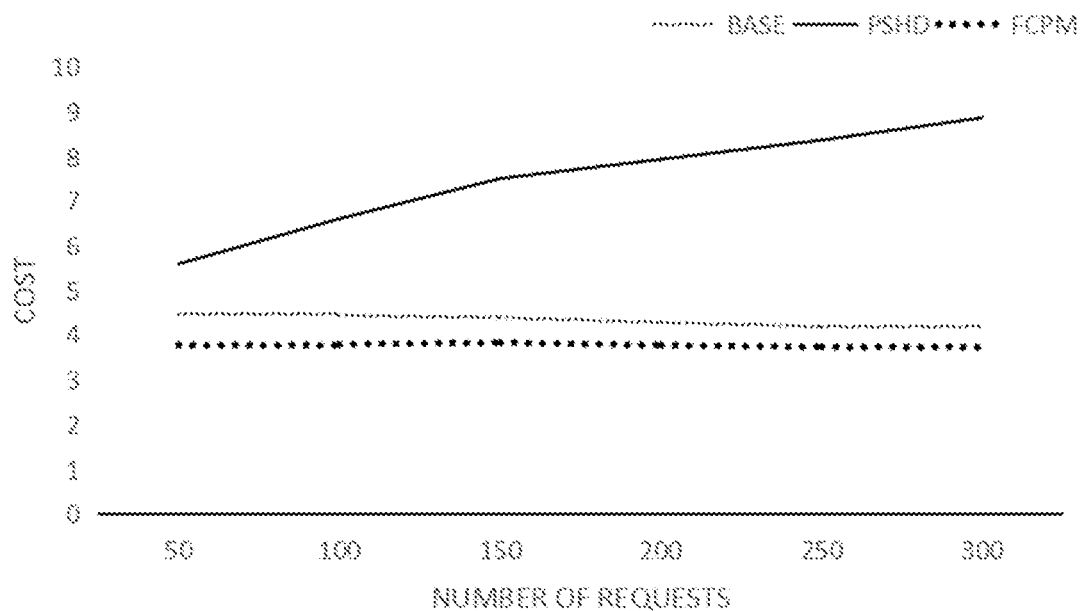
FIG. 10 is a comparison diagram of an average cost of each SFC under different requests.
Figure 11:
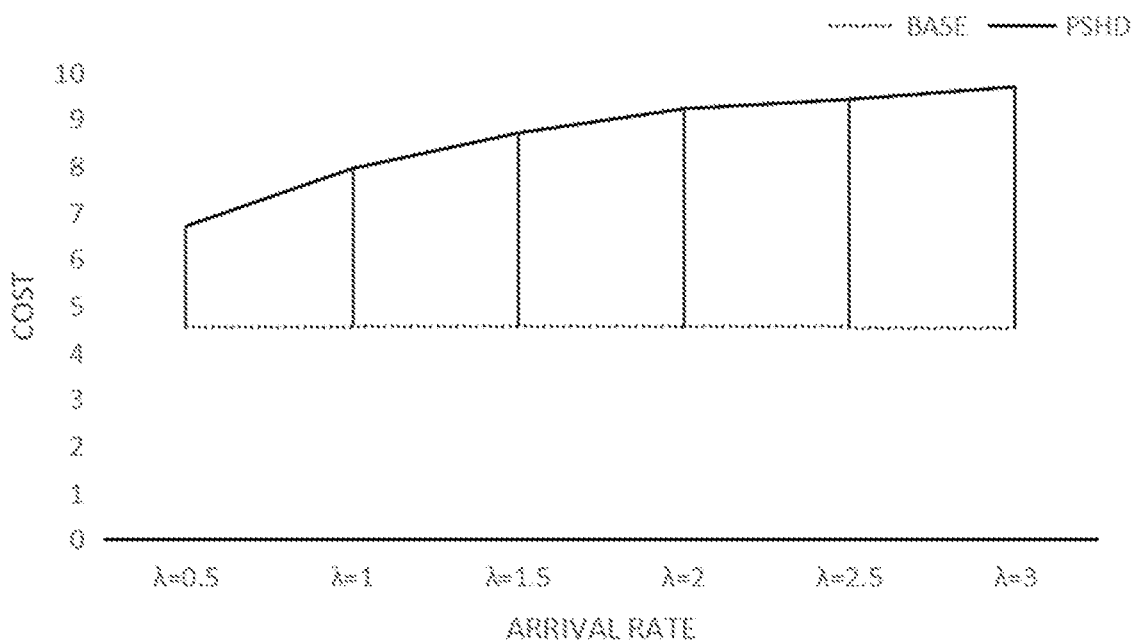
FIG. 11 is a comparison diagram of an average cost of each SFC under different arrival rates.
Figure 12:
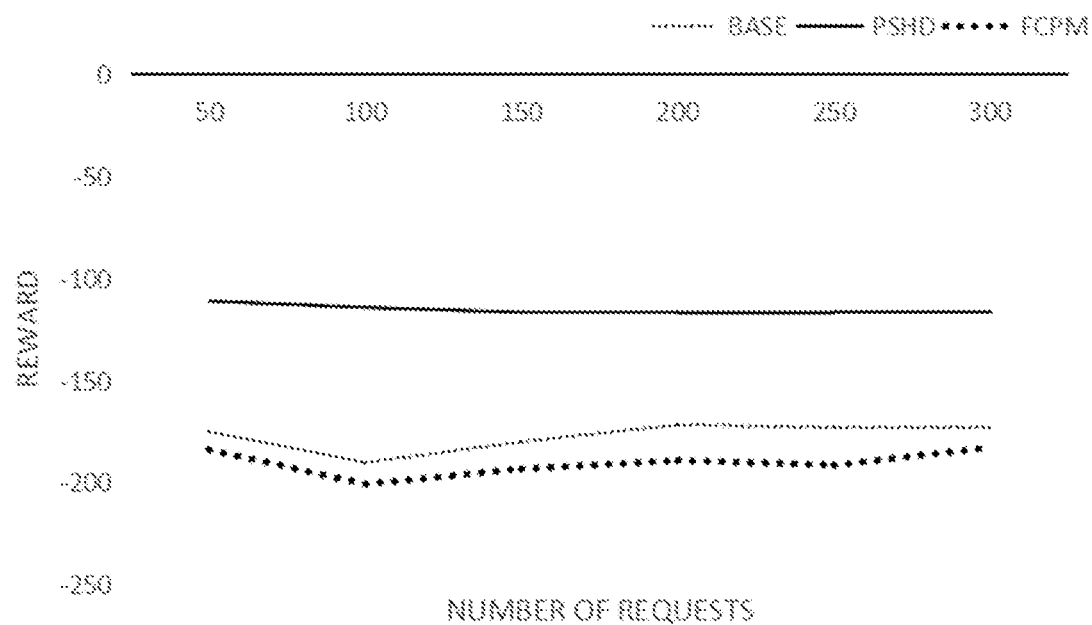
FIG. 12 is a comparison diagram of an average reward of each SFC under different requests.
Figure 13:
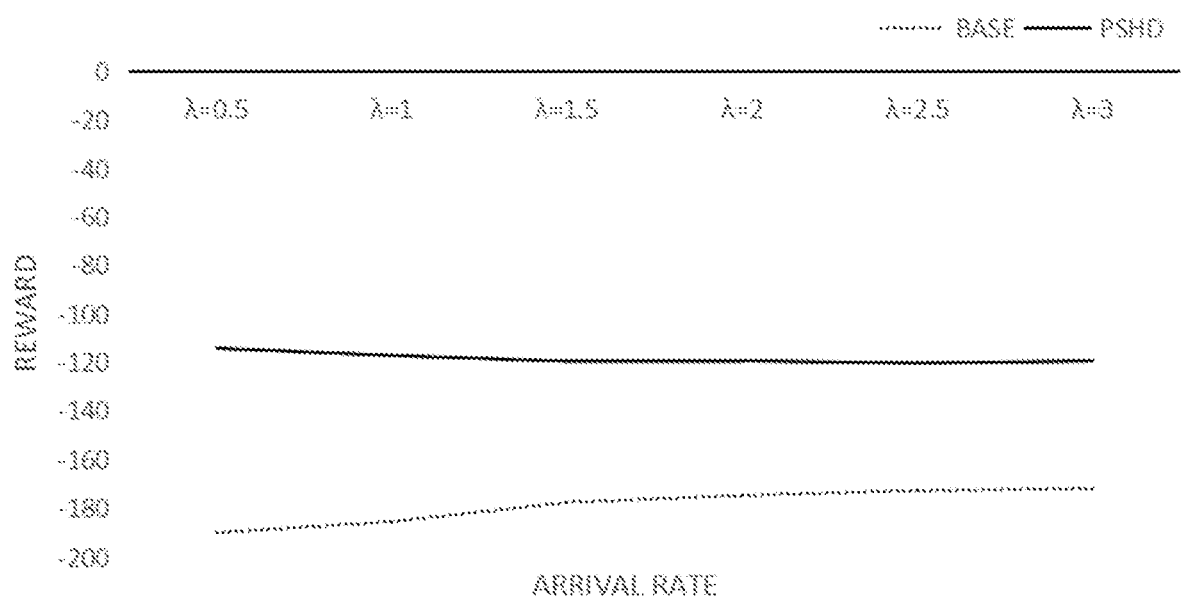
FIG. 13 is a comparison diagram of an average reward of each SFC under different arrival rates.

This embodiment compares the average delay of each SFC of three algorithms in a case that the number of the service nodes is 12 and the number of the requests changes from 50 to 300. As shown in FIG. 10, the cost of the method of the present invention is the highest and is increased with the increase of the number of the requests, because the method of the present invention introduces the heterogeneous architecture of CPU+DPU, that is, the DPU is used for rapid processing according to the situation, and the use cost of the DPU is higher. FIG. 11 also shows that in a case that the number of the requests is 100 and the arrival rate of the requests changes from 0.5 to 3, the cost of the method of the present invention is always the highest, with an average of 8.61, and the average cost of BASE is 4.55. The increase of the cost of the method of the present invention brings the increase of the request acceptance rate and the reduction of the delay, as shown in FIG. 6 to FIG. 9, and as shown in FIG. 12 to FIG. 13, the reward of the method of the present invention is always the highest. The above proves that sacrificing part of the cost can bring better benefits.

Figure 14:
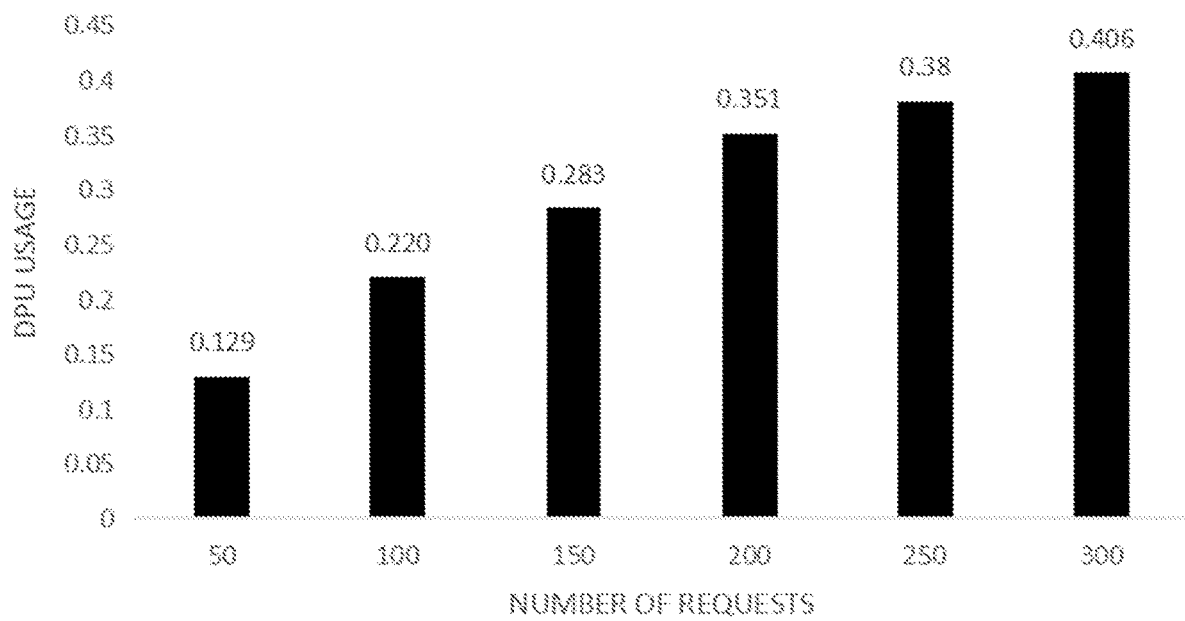
FIG. 14 is a diagram of a DPU usage under different requests.
Figure 15:
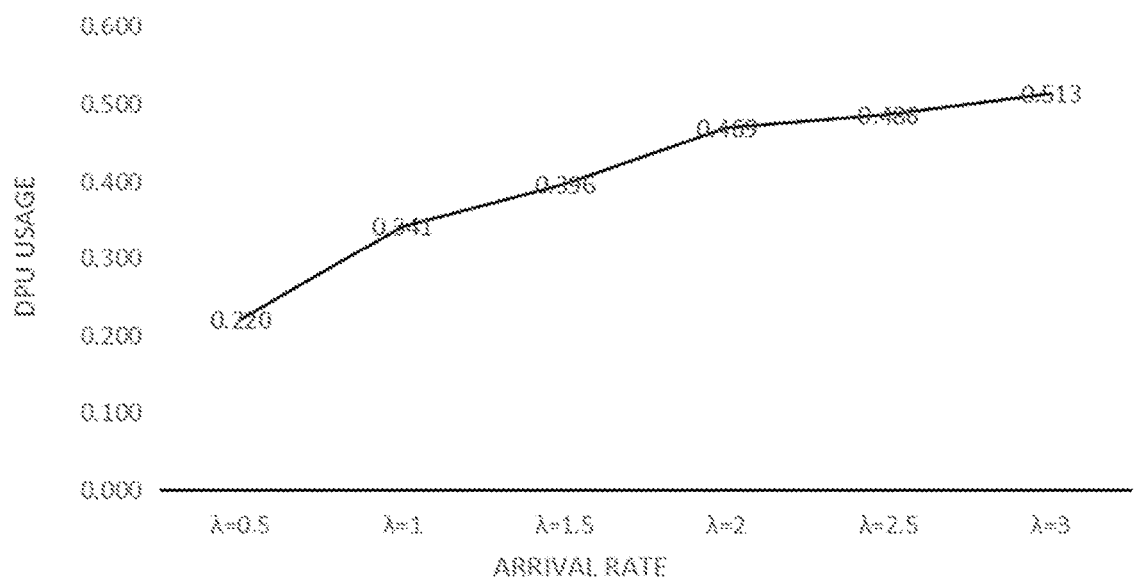
FIG. 15 is a diagram of a DPU usage under different arrival rates.

Finally, in this embodiment, the DPU usage is compared in a case that the number of the service nodes is 12 and the number of the requests changes from 50 to 300, and in a case that the number of the requests is 100 and the arrival rate of the requests changes from 0.5 to 3. As shown in FIG. 14 and FIG. 15, the DPU usage is increased with the increase of the number of the requests/the arrival rate of the requests, and the increase of the DPU usage brings the increase of the cost, as shown in FIG. 10 to FIG. 11, higher request acceptance rate compared with other algorithms, as shown in FIG. 8 to FIG. 9, and lower delay, as shown in FIG. 6 to FIG. 7. It can be seen from the reward comparison of the three algorithms in FIG. 12, the performance of the method of the present invention is much higher than those of other algorithms.

What is claimed is:

1. An efficient parallelization and deployment method of a multi-objective service function chain based on a CPU+DPU platform, comprising the following steps:
   (1) constructing a heterogeneous computing architecture for solving a multi-objective deployment problem, wherein the heterogeneous computing architecture comprises an orchestrator responsible for management and coordination, and a server based on a CPU+DPU structure;
   (2) converting serial SFCs into parallel SFCs by an SFC parallel strategy according to the independence among VNFs, and accordingly solving an SFC parallel problem;
   wherein an objective function of the SFC parallel problem is to minimize additional resource consumption and delay caused by copying and merging of the data packet:

$$\min(\alpha C + \beta \Delta d)$$

wherein $\alpha$ and $\beta$ respectively represent weight coefficients of the additional resource consumption and delay, $$C = \sum_{\mu=1}^{|R|} \sum_{\forall B \in r_\mu} 64 \times \frac{\Phi_B - 1}{U}$$

represents the additional resource consumption caused by the copying and merging of the data packet, $$\Delta d = \sum_{\mu=1}^{|R|} 30 \times \frac{v_\mu}{10^9}$$

represents the additional delay caused by the copying and merging of the data packet, R represents one group of SFC requests in a network, $r_\mu$ represents a $\mu^{th}$ SFC request, B is one group of parallel branches, $\Phi_B$ represents the parallelism degree of the B, U represents the size of the data packet, and $V_\mu$ is the data quantity of the $\mu^{th}$ SFC in the requests R;
   an objective of the SFC parallel strategy is to identify a VNF in the chain according to a dependency relationship among the VNFs to find all chains executable in parallel;
   wherein the SFC parallel strategy comprises: dividing the VNFs into two types of monitors and shapers, wherein the monitors are responsible for monitoring a flow rate without any modification, the shapers are used for processing and modifying the flow rate, and a specific algorithm process is as follows:
   21) initializing a branch chain set B, a main chain S and a monitor set M;
   22) traversing $r_\mu$: in a case that $f_i^\mu \in r_\mu$ is monitor, firstly initializing a branch chain $b \in B$, then adding $f_i^\mu$ into b and M; and in a case that $f_i^\mu \in r_\mu$ is shaper, adding $f_i^\mu$ into a main chain S, at this time, searching monitor on which $f_i^\mu$ depends on in M, for each such monitor, for example, $k \in M$, having a branch chain that takes k as an end point at present, then pointing k to $f_i^\mu$ so as to extend the branch chain to take $f_i^\mu$ as an end point, and removing k from M;
   23) Invoking a path search algorithm to find all path sets PATH executable in parallel; and
   24) Returning to the branch chain set B, the main chain S and the path set PATH;
   (3) for a situation that a plurality of SFCs arrive at the same time at a certain moment, adopting a VNF topological order algorithm, deploying the VNFs according to a topological order obtained by the algorithm, and reducing the delay in connection with the sharing and scaling characteristics of the VNFs,
   wherein the VNF topological order algorithm is used for constructing a VNF topological order for the plurality of SFCs and deploying the VNFs according to the ordering to reduce the delay;
   a specific process of the VNF topological order algorithm is as follows:
   31) Initializing f as a source node;
   32) Traversing a request set R arriving at the same time, invoking the SFC parallel strategy to obtain the branch chain set B, the main chain S and the path set PATH, evaluating a path with a maximum delay in all the paths according to the path set PATH, and adding the path into a set C;
   33) traversing C, and creating a directed weighted graph graph=(F, ω), F being a set of VNFs, and ω being a weight between edges;
   34) Invoking a minimum feedback arc set algorithm to solve a minimum feedback arc set of the graph, and verifying whether the solved topological order meets the dependency relationship of the VNFs among different chains, returning to the topological order in a case that the solved topological order meets the dependency relationship of the VNFs among different chains, otherwise, returning to False;

(4) adopting a DPU processing strategy for a service request with a high real-time requirement, wherein the DPU processing strategy is used for processing computing tasks comprising network protocol processing, data encryption and decryption and data compression to save a CPU computing resource and reduce the delay;

in a case that there is a high-priority request in the request set that arrives at a certain moment, determining whether there is a VNF responsible for the data processing task in the request, using DPU for rapid processing in a case that there is a VNF responsible for the data processing task in the request, and using CPU for processing in a case that there is no VNF responsible for the data processing task in the request;

(5) proposing an SFC heterogeneous deployment algorithm based on deep reinforcement learning, wherein the heterogeneous algorithm is capable of completing deployment of the SFC respectively according to the number and situation of the requests arriving at different moments, according to the number and situation of the requests arriving at different moments, the SFC heterogeneous deployment algorithm based on deep reinforcement learning adopts different strategies respectively for processing, comprising: performing a parallel strategy, a VNF topological order strategy and a DPU processing strategy to achieve the deployment of the SFC, and a specific operation of deploying the SFC in step (5) is as follows:

51) Deleting a timeout request by a system first, dividing the arrived requests R by a priority judgment apparatus according to real-time performance, dividing the request with high real-time performance into a high-priority R_high, and dividing the requests with low real-time performance into a low-priority R_low;

52) initializing a time slot $\tau$;

53) According to the numbers of R_high and R_low, determining which strategy to be adopted to process the SFC;

54) Constructing and training a neural network model, taking a status of a current physical network and a characteristic of the request being processed as an input, and outputting a deployment strategy of each VNF through the computation of the neural network; and 55) Updating the network status.

2. The efficient parallelization and deployment method of a multi-objective service function chain based on a CPU+DPU platform according to claim 1, wherein the heterogeneous computing architecture in step (1) is composed of an orchestrator and a server, the orchestrator comprises an SFC deployment algorithm module, a resource management module and a driver module;

the server comprises a CPU, a DPU and a bus for connecting the CPU and the DPU;

the orchestrator is responsible for managing and deploying the arrived SFC, and the server composed of a heterogeneous computing structure is responsible for sequentially processing VNFs in different SFCs according to the deployment strategy conveyed by the orchestrator; wherein a specific task of the orchestrator comprises: receiving an SFC request from a network operator, and running the SFC deployment algorithm to determine which SFCs are accepted and how to place these SFCs; and for different situations of different requests, the method respectively invokes the parallel strategy, the VNF topological order strategy and the DPU processing strategy so as to obtain an optimal deployment scheme of each request, then a resource management module is invoked to manage resources, and finally, a driver module is invoked to transmit the deployment scheme to a server for placement, and the server completes the deployment of the SFC by using the CPU or the DPU respectively according to the deployment scheme.

3. The efficient parallelization and deployment method of a multi-objective service function chain based on a CPU+DPU platform according to claim 1, wherein the multi-objective deployment problem in step (1) is specifically described as follows:

an objective function of the SFC deployment problem is as follows:

$$\min(f_1 + f_2 + f_3)$$
$$\text{s.t. } C_1, C_2, C_3$$
$$\begin{cases} f_1 = \sum_{r_\mu \in R} D_\mu \\ f_2 = \sum_{r_\mu \in R} y_{r_\mu} B_\mu \tau_r \\ f_3 = C(\tau) \end{cases}$$

for $f_1$, $D_\mu$ is a total response delay, that is, $$D_\mu = L_\mu + P_\mu + T_\mu + \overline{W}_q$$

wherein $L_\mu$ is a communication delay, $P_\mu$ is a processing delay, $T_\mu$ is a transmission delay, and $\overline{W}_q$ is an average queuing delay;

for $f_2$, $\Sigma_{r_\mu \in R} y_{r_\mu} B_\mu \tau_r$ is a total throughput, wherein the binary variable $y_{r_\mu}$ represents whether $r_\mu$ is accepted, $B_\mu$ is a minimum bandwidth of the SFC, and $\tau_r = l*\Delta$ represents a survival time of the SFC;

for $f_3$, $C(\tau)$ represents a total deployment cost, with the following expression:

$$C(\tau) = SC(\tau) C_{scale}(\tau) + C_{DPU}(\tau)$$

$SC(\tau)$ represents a total operation cost, i.e., a sum of a cost of turning on the server and a cost of successfully placing the VNF:

$$SC(\tau) = \Sigma_{n_i \in N} \Sigma_{f_v^\mu \in F_\mu} x_{f_v^\mu}^{n_i} \zeta_c C_{f_v^\mu} + \Sigma_{e_j \in E} \Sigma_{e_h^\mu \in E_\mu} x_{e_h^\mu}^{e_j} \zeta_B B_\mu + \Sigma_{n_i \in N} \zeta_O$$

$x_{f_v^\mu}^{n_i}$ represents whether VNF $f_v^\mu \in F_\mu$ is deployed on a server node $n_i \in N$ in the request $r_\mu \in R$, $x_{e_h^\mu}^{e_j}$ represents whether a virtual link $e_h^\mu \in E_\mu$ is mapped to a physical link $e_j \in E$ in the request $r_\mu \in R$, $\zeta_c$ and $\zeta_B$ respectively represent the unit costs of the resource and the bandwidth, $C_{f_v^\mu}$ represents the resource requirement of VNF $f_v^\mu \in F_\mu$, and $\zeta_O$ represents the cost of turning on the server;

$C_{scale}(\tau) = \Sigma_{n_i \in N} \Sigma_{f_v^\mu \in F_\mu} C^h \cdot x_{n_i,h}^{f_v^\mu}$ represents a total scaling cost, wherein $C^h$ represents a horizontal scaling cost, and $x_{n_i,h}^{f_v^\mu}$ represents whether VNF $f_v^\mu \in F_\mu$ is horizontally scaled;

$C_{DPU}(\tau)$ represents a total use cost of the DPU and is defined as follows:

$$C_{DPU}(\tau) = \Sigma_{n_i \in N} \Sigma_{f_v^\mu \in F_\mu} \zeta_{c_D} x_{n_i,D}^{f_v^\mu} C_{f_v^\mu} + \zeta_{B_D} x_{n_i,D}^{f_v^\mu} B_\mu$$

wherein $\zeta_{c_D}$ and $\zeta_{B_D}$ represent the unit costs of the resource and bandwidth during use of the DPU, and $x_{n_i,D}^{f^\mu}$ represents whether VNF $f_v^\mu \in F_\mu$ is processed with the DPU; and $C_1$ represents a resource constraint, $C_2$ represents a bandwidth constraint, and $C_3$ represents a delay constraint.

4. The efficient parallelization and deployment method of a multi-objective service function chain based on a CPU+DPU platform according to claim 2, wherein the multi-objective deployment problem in step (1) is specifically described as follows:

an objective function of the SFC deployment problem is as follows:

$$\min(f_1 + f_2 + f_3)$$
$$\text{s.t. } C_1, C_2, C_3$$
$$\begin{cases} f_1 = \sum_{r_\mu \in R} D_\mu \\ f_2 = \sum_{r_\mu \in R} y_{r_\mu} B_\mu \tau_r \\ f_3 = C(\tau) \end{cases}$$

for $f_1$, $D_\mu$ is a total response delay, that is, $$D_\mu = L_\mu + P_\mu + T_\mu + \overline{W_q}$$

wherein $L_\mu$ is a communication delay, $P_\mu$ is a processing delay, $T_\mu$ is a transmission delay, and $\overline{W_q}$ is an average queuing delay;

for $f_2$, $\Sigma_{r_\mu \in R} y_{r_\mu} B_\mu \tau_r$ is a total throughput, wherein the binary variable $y_{r_\mu}$ represents whether $r_\mu$ is accepted, $B_\mu$ is a minimum bandwidth of the SFC, and $\tau_r = 1*\Delta$ represents a survival time of the SFC;

for $f_3$, $C(\tau)$ represents a total deployment cost, with the following expression:

$$C(\tau) = SC(\tau) + C_{scale}(\tau) + C_{DPU}(\tau)$$

$SC(\tau)$ represents a total operation cost, i.e., a sum of a cost of turning on the server and a cost of successfully placing the VNF:

$$SC(\tau) = \Sigma_{n_i \in N} \Sigma_{f_v^\mu \in F_\mu} x_{f_v^\mu}^{n_i} \zeta_c C_{f_v^\mu} + \Sigma_{e_j \in E} \Sigma_{e_h^\mu \in E_\mu} x_{e_h^\mu}^{e_j} \zeta_B B_\mu + \Sigma_{n_i \in N} \zeta_O$$

$x_{f_v^\mu}^{n_i}$ represents whether VNF $f_v^\mu \in F_\mu$ is deployed on a server node $n_i \in N$ in the request $r_\mu \in R$, $x_{e_h^\mu}^{e_j}$ represents whether a virtual link $e_h^\mu \in E_\mu$ is mapped to a physical link $e_j \in E$ in the request $r_\mu \in R$, $\zeta_c$ and $\zeta_B$ respectively represent the unit costs of the resource and the bandwidth, $C_{f_v^\mu}$ represents the resource requirement of VNF c and represents the cost of turning on the server;

$$C_{scale}(\tau) = \Sigma_{n_i \in N} \Sigma_{f_v^\mu \in F_\mu} C^h \cdot x_{n_i,h}^{f_v^\mu}$$ represents a total scaling cost, wherein $C^h$ represents a horizontal scaling cost, and $x_{n_i,h}^{f_v^\mu}$ represents whether VNF $f_v^\mu \in F_\mu$ is horizontally scaled;

$C_{DPU}(\tau)$ represents a total use cost of the DPU and is defined as follows:

$$C_{DPU}(\tau) = \Sigma_{n_i \in N} \Sigma_{f_v^\mu \in F_\mu} \zeta_{c_D} x_{n_i,D}^{f^\mu} C_{f_v^\mu} + \zeta_{B_D} x_{n_i,D}^{f_v^\mu} B_\mu$$

wherein $\zeta_{c_D}$ and $\zeta_{B_D}$ represent the unit costs of the resource and bandwidth during use of the DPU, and $x_{n_i,D}^{f^\mu}$ represents whether VNF $f_v^\mu \in F_\mu$ is processed with the DPU; and $C_1$ represents a resource constraint, $C_2$ represents a bandwidth constraint, and $C_3$ represents a delay constraint.

5. The efficient parallelization and deployment method of a multi-objective service function chain based on a CPU+DPU platform according to claim 1, wherein the SFC parallel problem in step (2) is specifically described as follows:

The serial SFCs which work independently without affecting other VNFs are converted into parallel SFCs; since the VNFs in the SFCs is applied to each data packet flow necessarily according to a specific order, the VNFs form a dependency relationship; the method stipulates that in a case that one VNF $f_v^\mu$ is before another VNF $f_{v+1}^\mu$, $f_{v+1}^\mu$ depends on $f_v^\mu$, denoted as $f_v^\mu < f_{v+1}^\mu$;

to process the data packets in parallel, two functions of copying and merging are required; when one data packet enters, the copying function will copy and send the data packet to the VNFs capable of being processed in parallel; and after the data packet is processed, the copied data packet is merged by the merging function, and the copying and merging of the data packet will cause additional resource consumption and delay.

6. The efficient parallelization and deployment method of a multi-objective service function chain based on a CPU+DPU platform according to claim 1, wherein for the SFC parallel problem, a flow constraint is introduced, $O_c$ is used for representing a set of copying nodes in $r_\mu$, $O_m$ represents a set of merging nodes in $r_\mu$, $O_c(n_i)$ and $O_m(n_i)$ respectively represent the number of the copying nodes and the merging nodes in $r_\mu$; and for SFC $r_\mu$, all intermediate nodes meet flow conservation except the copying nodes, the merging node, the source node and the target node.

* * * * *